United States Patent
Aurich et al.

(10) Patent No.: US 8,276,995 B2
(45) Date of Patent: Oct. 2, 2012

(54) CONTROL DEVICE FOR A RAIL VEHICLE

(75) Inventors: Stefan Aurich, Friedberg (DE);
Johannes Schuhmacher, München (DE); Jörg-Johannes Wach, München (DE); Ulf Friesen, Neubiberg (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 866 days.

(21) Appl. No.: 11/817,484

(22) PCT Filed: Feb. 28, 2006

(86) PCT No.: PCT/EP2006/001810
§ 371 (c)(1),
(2), (4) Date: Jan. 24, 2008

(87) PCT Pub. No.: WO2006/092263
PCT Pub. Date: Sep. 8, 2006

(65) Prior Publication Data
US 2008/0156944 A1    Jul. 3, 2008

(30) Foreign Application Priority Data

Mar. 2, 2005 (DE) .......................... 10 2005 010 118

(51) Int. Cl.
*B60T 13/00* (2006.01)
*B60T 15/14* (2006.01)
*B60T 8/88* (2006.01)
(52) U.S. Cl. ........................................ 303/122; 303/20
(58) Field of Classification Search .................. 303/122, 303/7, 20; 73/766, 862.623
See application file for complete search history.

(56) References Cited

U.S. PATENT DOCUMENTS

| | | | | |
|---|---|---|---|---|
| 3,059,107 A | | 10/1962 | McCool | |
| 4,027,753 A | * | 6/1977 | Lantz | 188/181 R |
| 4,905,507 A | * | 3/1990 | Klein et al. | 73/115.08 |

(Continued)

FOREIGN PATENT DOCUMENTS
DE         3 809 886 C2    10/1989
(Continued)

OTHER PUBLICATIONS

Japanese Office Action dated Nov. 25, 2011.

*Primary Examiner* — Bradley King
*Assistant Examiner* — Vishal Sahni
(74) *Attorney, Agent, or Firm* — Barnes & Thornburg LLP

(57) ABSTRACT

A control unit for a rail vehicle, comprising a braking control unit that contains an electronic braking control device for emitting control commands to brake actuators and/or comprising an anti-skid device, which controls the wheel slip of the wheels of at least one axle in accordance with at least one rotational speed signal from an anti-skid sensor. The control unit also comprises a roll monitoring unit with an electronic roll monitoring control device and at least one roll monitoring sensor for detecting the rotational speed of at least some wheels in the form of a rotational speed signal, and comprises a rolling gear monitoring unit for monitoring and/or diagnosing critical conditions of and damage to the rolling gear. The monitoring unit comprises an electronic control device for monitoring the rolling gear. The electronic control device for monitoring the rolling gear and/or the electronic anti-skid control device and/or the electronic braking control device and/or the electronic roll monitoring control device are combined to form a structural unit.

4 Claims, 2 Drawing Sheets

U.S. PATENT DOCUMENTS

| | | | | |
|---|---|---|---|---|
| 4,971,179 | A | * | 11/1990 | Gebhardt et al. ............... 188/33 |
| 5,201,834 | A | * | 4/1993 | Grazioli et al. ............ 246/169 R |
| 5,411,323 | A | * | 5/1995 | Takahashi et al. ............... 303/20 |
| 5,803,211 | A | * | 9/1998 | Wilke ............................ 188/173 |
| 7,184,930 | B2 | * | 2/2007 | Miyasaka et al. .............. 702/183 |
| 2002/0088673 | A1 | * | 7/2002 | Malac ....................... 188/1.11 R |
| 2004/0041465 | A1 | * | 3/2004 | Mayer et al. .................... 303/20 |
| 2004/0046442 | A1 | * | 3/2004 | Aurich et al. ..................... 303/7 |
| 2005/0006948 | A1 | * | 1/2005 | Friesen ........................... 303/20 |
| 2005/0133317 | A1 | * | 6/2005 | Chen et al. .................... 188/193 |
| 2006/0086577 | A1 | * | 4/2006 | Lohberg et al. ........... 188/181 A |

FOREIGN PATENT DOCUMENTS

| | | | |
|---|---|---|---|
| DE | 3 824 985 | A1 | 1/1990 |
| DE | 413 754 6 | C2 | 5/1993 |
| DE | 020 20 772 | U1 | 4/2004 |
| DE | 103 32 034 | A1 | 2/2005 |
| EP | 0 794 102 | A1 | 9/1997 |
| EP | 0794102 | A | 9/1997 |
| GB | 2216664 | | 10/1989 |
| GB | 226 195 3 | | 6/1993 |
| JP | 10-274942 | | 10/1998 |
| JP | 2000-64962 | | 3/2000 |
| JP | 2001-523618 | | 11/2001 |
| JP | 2003-160043 | | 11/2001 |
| JP | 2002-070610 | | 3/2002 |
| JP | 2002-295464 | * | 9/2002 |
| JP | 2004-93256 | | 3/2004 |
| WO | WO2004027370 | * | 4/2004 |

\* cited by examiner

CONTROL DEVICE FOR A RAIL VEHICLE

BACKGROUND AND SUMMARY OF THE INVENTION

The present control device is for a rail vehicle having a brake control device and/or an electronic roll monitoring control unit and with a rolling gear monitoring device. The brake control device includes an electronic brake control unit for outputting control commands to the brake actuators. The anti-skid device controls the wheel slip of the wheels of at least one axle as a function of at least one rotational speed signal supplied to an electronic anti-skid control unit by an anti-skid sensor. The roll monitoring device includes an electronic roll monitoring control unit and at least one roll monitoring sensor for sensing the rotational speed of at least a number of wheels in the form of a rotational speed signal. The rolling gear monitoring device monitors and/or for diagnoses the rolling gear with respect to critical states and damage such as, for example, derailment, overheated bearings, unstable running and the like, and includes an electronic rolling gear monitoring control unit.

Anti-skid devices are prescribed by UIC-sheet 541-05 for all rail vehicles with high power brakes of the R type in which each bogey is to be monitored separately. Such anti-skid devices are intended to prevent the wheel sets locking during braking and to achieve optimum utilization of the available frictional engagement between the wheel and rail. As a result, flat points on the wheels are avoided and the braking distances are shortened. For this purpose, the rotational speeds of all the axles of one vehicle unit are sensed by rotational speed sensors. On this basis, a microprocessor of the electronic anti-skid control device calculates the actual vehicle speed or train speed and calculates, per axle or per bogey by means of electropneumatic anti-skid valves, the brake cylinder pressure which is predefined by the brake controller. Such electronic anti-skid control units are usually present in every rail car.

For vehicles with a maximum speed of over 200 km/h, the UIC 541-05 also prescribes, in addition to an anti-skid device, a roll monitoring device which senses disturbances in the rotation of wheels or the failure of wheels to rotate and actuates a corresponding reporting signal. Such roll monitoring devices comprise rotational speed sensors which sense the rotational speeds of the wheels of a vehicle unit and corresponding signals modulate a roll monitoring control unit.

Furthermore, nowadays rolling gear monitoring devices are becoming increasingly important in rail traffic. For safety reasons, these monitoring systems are standardized by guidelines. Examples of this are the following systems which are required on the basis of the technical specifications for interoperability (TSI) of the data sheet of the European Union for high speed trains:
  on-board systems for detecting derailment,
  on-board systems for detecting overheated bearings or damage to bearings,
  on-board systems for detecting unstable running or defective dampers.

Such rolling gear monitoring devices are already in use. For example, in the current ICE train a system for detecting unstable running is used and in newer automatic underground railways a system for detecting derailment is in use. These systems have in common the fact that they are constructed functionally as stand-alone systems and act independently.

The problem with these running gear monitoring devices as systems with separate structures (stand-alone solution) is the relatively high complexity of and costs for their implementation. This is because installing such a system requires additional assemblage, sensors, cabling and installation space. Furthermore, the complexity of the technical equipment is increased, which has adverse effects on reliability.

In contrast, the present control device is a control device of the type mentioned at the beginning in such a way that the abovementioned disadvantages are avoided.

The electronic rolling gear monitoring control unit according to the disclosure is combined with the electronic anti-skid control unit and/or with the electronic brake control unit and/or with the roll monitoring control unit to form one structural unit.

The rolling gear monitoring control unit requires, in particular, the rotational speed signals of the wheel axles or of the wheels in order to carry out the monitoring function. These signals can be passed on internally at low expenditure if the rolling gear monitoring control unit is combined with the anti-skid control unit and/or with the brake control unit and/or with the roll monitoring control unit to form one structural unit or is present in an integrated design. Furthermore, various status signals relating to the current braking behavior and travel behavior are directly available to the monitoring algorithms that are implemented in the monitoring control unit, and permit more effective diagnostics.

The structural unit composed of the rolling gear monitoring control unit and anti-skid control unit and/or roll monitoring control unit and/or brake control unit also provides the possibility of using certain system components jointly, for example, a common power supply, a common interface for communicating with an operator and a common interface for communicating with the vehicle control system. This reduces the expenditure on equipment. If a relatively powerful computing unit is used, it is also possible to conceive of parallel processing of anti-skid algorithms, roll monitoring algorithms and rolling gear monitoring algorithms.

Last but not least, the use of the rolling gear monitoring device to diagnose and carry out early detection of damaged components, critical states or other faults, for example, to detect flat points on wheels or which carry out early detection of damage to bearings, permit early and status-oriented maintenance. The objective here is shorter downtimes, better utilization of components and thus reduction of costs.

The rolling gear monitoring control unit evaluates the rotational speed of the roll monitoring sensor and/or of the anti-skid sensor. In the process, the use of sensors, which simultaneously supply the axle speed signals and/or wheel rotational speed signals to the rolling gear monitoring device and/or to the anti-skid device and/or to the roll monitoring device and/or to the brake control device, reduces the expenditure on installing sensors and/or on cabling. Possible damage can be determined on the basis of the rotational speed of the axles or wheels using the rolling gear monitoring device.

A housing of the electronic rolling gear monitoring control unit and/or a housing of the electronic anti-skid control unit and/or a housing of the electronic brake control unit and/or a housing of the roll monitoring control unit may be connected to one another by flanges. Alternatively, at least part of the electronic rolling gear monitoring control unit and/or of the electronic anti-skid control unit and/or of the roll monitoring control unit and/or of the electronic brake control unit can be accommodated in a common housing.

According to one development, the rolling gear monitoring device and/or the anti-skid device and/or the brake control device and/or the roll monitoring device can have at least one common power supply and/or one common interface for communicating with an operator and/or one common interface for communicating with a vehicle control system. As a result of this, assemblies of different devices are used jointly in a cost effective way. The common interface for communicating with the vehicle control system may be connected to a vehicle bus in order, for example, to signal critical states, which have been detected by the rolling gear monitoring device, to a display device.

The rotational speed sensor which is originally assigned only to the anti-skid device and/or the rolling gear monitoring device and is provided at first only for measuring the rotational speed, can, for example, be expanded to form a combination sensor which, apart from the signal for the wheel speed or axle speed, modulates a signal for the temperature of a wheel set bearing and/or an oscillation signal for oscillations occurring at the wheel set bearing. In this context, the combination sensor may be arranged directly on the wheel set bearing to be monitored or in the direct vicinity of the wheel set bearing.

These and other aspects of the present disclosure will become apparent from the following detailed description of the disclosure, when considered in conjunction with the accompanying drawings.

BRIEF DESCRIPTION OF THE DRAWINGS

An exemplary embodiment of the invention is illustrated in the drawing and explained in more detail in the following description. In the drawings.

DESCRIPTION OF THE EXEMPLARY EMBODIMENT

Figure 1:
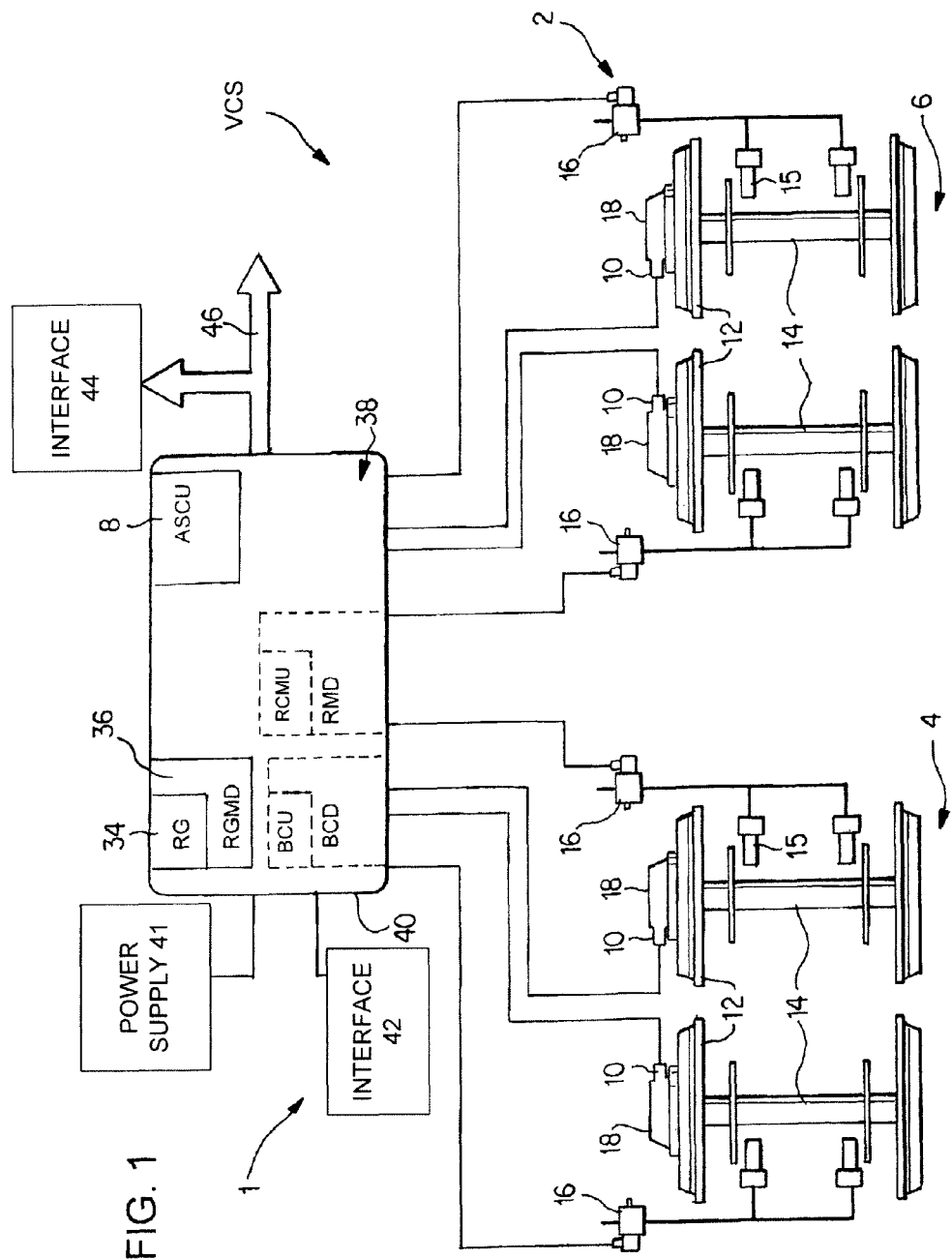
FIG. 1 is a schematic illustration of an anti-skid device of a rail car according to a preferred embodiment.

FIG. 1 is a schematic illustration of the design of an anti-skid device 1 of a rail car 2 with two dual-axle bogeys 4, 6. The rail car 2 is configured, for example, for a speed up to 200 km/h.

The anti-skid device 1 has an electronic anti-skid control unit 8 and sensors 10 on, for example, each wheel 12 of an axle 14 of a bogey 4, 6. The sensors 10 detect the instantaneous rotational speed of the respective axle or of the respective wheel. However, in FIG. 1, such a sensor 10 is illustrated on only one side of the axle in each case, for reasons of clarity. A microprocessor of the electronic anti-skid control unit 8 calculates the actual vehicle speed or train speed in a known fashion and reduces the brake cylinder pressure, predefined by the brake control device arranged in a driver's vehicle (not illustrated), in a brake cylinder 15 by electropneumatic anti-skid valves 16 on an axle by axle basis. The axles 14 are secured in a rotatable fashion by, in each case, two wheel bearings 18, near to the wheels, on the respective bogey 4, 6. However, in each case only one of the wheel set bearings 18 per axle 14 is shown in FIG. 1.

Figure 2:
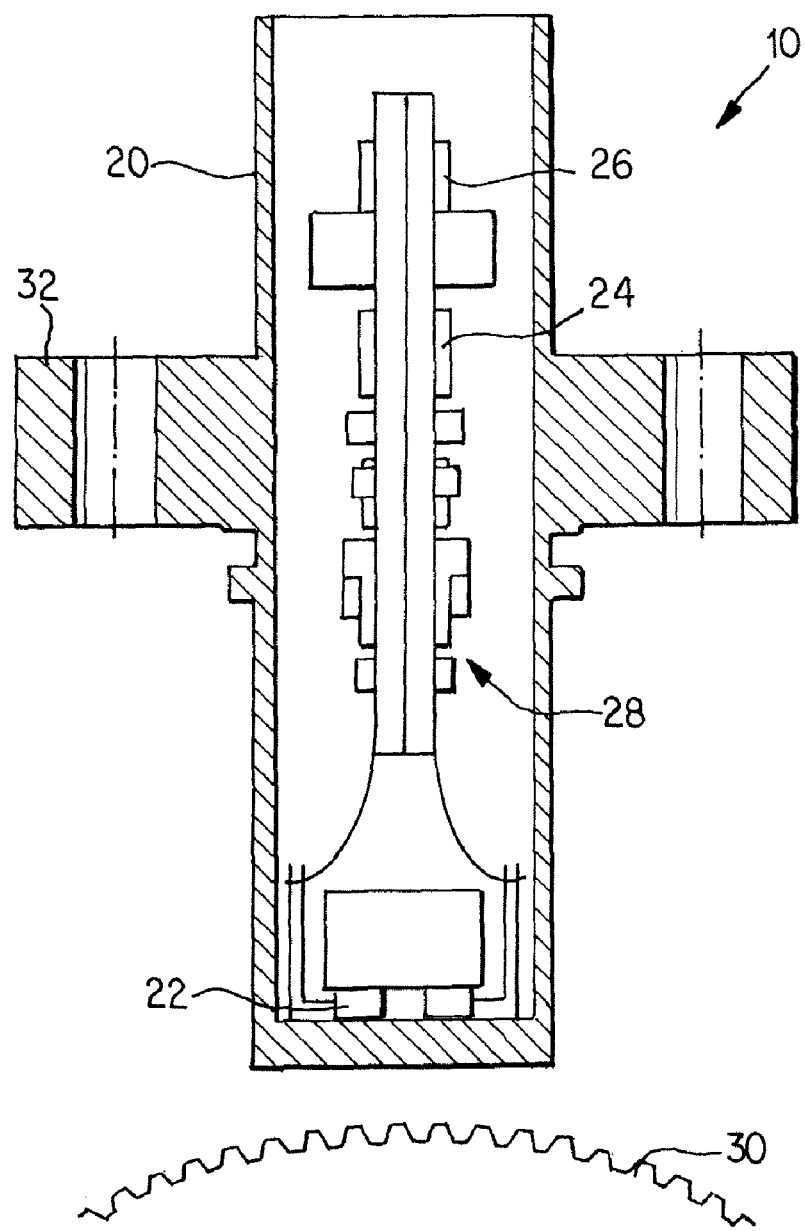
FIG. 2 is a schematic cross-sectional illustration of a combination sensor from FIG. 1 used in the anti-skid device.

A combination sensor 10 which is illustrated explicitly in FIG. 2 and with which the instantaneous rotational speed of the assigned axle 14 or of the assigned wheel 12, the instantaneous temperature of the respective wheel set bearing 18 and at least one longitudinal acceleration of the respective wheel set bearing 18 can be measured is assigned in each case to a wheel set bearing 18 of an axle 14.

According to one embodiment, a Hall sensor 22, a temperature sensor 24, an acceleration sensor 26 and an electronic evaluation system 28 for forming and modulating a rotational speed signal, a temperature signal and at least one acceleration signal, are in a housing 20 of the combination sensor 10. The combined sensor 10 extends transversely with respect to the wheel axle. A pole wheel 30, whose rotation generates a signal for the instantaneous rotational speed signal of the respective axle 14 or of the respective wheel 12, and which rotates along with the respective axle 14 or with the respective wheel 12, is located opposite the Hall sensor 22. The housing 20 has an external flange 32 by which the combination sensor 10 can be detachably mounted directly on the respective wheel set bearing 18. As a result, the solid-borne sound acting on the wheel set bearing 18 and originating, for example, from flattened portions on a wheel 12 of the axle 14 or from a defective wheel set bearing 18 is transmitted to the housing 20 of the combination sensor 10 and can then be detected by the acceleration sensor 26. The acceleration sensor 26 may measure longitudinal oscillations in all three spatial axes but fewer measuring directions are also possible. In the same way, the temperature which prevails in the respective wheel set bearing 18 is transmitted to the temperature sensor 24.

These signals are applied by the evaluation electronic system 28 to, inter alia, a rolling gear monitoring control unit 34 of a rolling gear monitoring device 36 which can carry out the following monitoring functions:

warmed up and overheated bearing detection for the respective wheel set bearing 18 by monitoring the temperature of the wheel set bearing 18;

detection of damage to the respective wheel set bearing 18 by means of corresponding oscillation signals;

detection of unstable running or of defective dampers in the running gear by means of corresponding oscillation signals;

detection of derailment, and detection of flat points and nonround wheels 12 by means of corresponding oscillation signals.

The functions of detection of derailment, detection of overheated bearings and detection of unstable running behavior are requirements or recommendations of the TSI for high speed trains. The temperature signals, rotational speed signals and acceleration signals of the combination sensors 10 can additionally be used as diagnostic data for the early detection of defective components or defective sections of the rails.

The rolling gear monitoring control unit 34 is combined with the anti-skid control unit 8 in one structural unit 38. This can be carried out, for example, by virtue of the fact that a housing of the electronic rolling gear monitoring control unit 34 and a housing of the electronic anti-skid control unit 8 are connected to one another by flanges. However, the electronic rolling gear monitoring control unit 34 and the electronic anti-skid control unit 8 are preferably accommodated in a common housing 40.

The rolling gear monitoring device 36 and the anti-skid device 1 can have at least one common power supply 41, one common interface 42 for communicating with an operator and one common interface 44 for communicating with a vehicle control system VCS. The common interface 44 for communicating with the vehicle control system is connected, in particular, to a vehicle bus 46 in order, for example, to signal critical states, which the rolling gear monitoring device 36 has detected, to an operator display device ODD.

If the respective rail vehicle is not a rail car 2 but rather the driver's vehicle of the rail vehicle train, a central electronic brake control unit of the brake control device which performs open-loop and closed-loop control on the braking processes of the entire rail vehicle train is present in said driver's vehicle. The electronic brake control unit of other brake control device may be combined with the electronic gear monitoring control unit as illustrated in phantom in FIG. 1.

If a rail car or a driver's vehicle is configured for speeds above 200 km/h, there is, in addition to the anti-skid device 1, also a roll monitoring device with an electronic roll monitoring control unit which receives the rotational speed signals of the combination sensor 10 (as shown in phantom in FIG. 1) and determines therefrom whether there are disruptions in the rolling or rotation of the wheels of the rail vehicle.

Depending on the equipment and type of the rail vehicle, the electronic rolling gear monitoring control unit is then to be combined with the electronic anti-skid control unit and/or with the electronic brake control unit and/or with the roll monitoring control unit to form one structural unit.

Although the present disclosure has been described and illustrated in detail, it is to be clearly understood that this is done by way of illustration and example and is not to be taken by way of limitation. The scope of the present disclosure is to be limited only by the terms of the appended claims.

The invention claimed is:

1. A control device for a rail vehicle comprising:
    a combination sensor that generates a rotational speed signal and at least one of a signal indicating a temperature of a wheel set bearing and an oscillation signal indicating oscillations occurring at the wheel set bearing,
    a first device, wherein the first device is a rolling gear monitoring device that monitors critical states and damage of a rolling gear,
    a second device, wherein the second device is an anti skid device which controls the wheel slip of the wheels of at least one axle as a function of the rotational speed signal supplied to an electronic anti-skid control unit by the combination sensor, and
    a third device, wherein the third device is a roll monitoring device that senses disturbances in the rotation of wheels or the failure of wheels to rotate and including an electronic roll monitoring control unit which receives the rotational speed signal of the combination sensor,
    wherein the first device, the second device and the third device are combined to form one structural unit,
    wherein the rolling gear monitoring device evaluates the rotational speed signal of the combination sensor, and
    wherein the first device, the second device and the third device have at least one of a common power supply and a common interface for communicating with an operator and a common interface for communicating with a vehicle control system.

2. The control device of claim 1, wherein the common interface for communicating with the vehicle control system is connected to a vehicle bus.

3. The control device of claim 2, further comprising a display device configured to signal critical states which the rolling gear monitoring device has detected.

4. A rail vehicle containing the control device of claim 1.

* * * * *